3,278,538
HEXAHYDRO-9-ACRIDANOLS
Joseph Albert Meschino, North Wales, Pa., assignor to McNeil Laboratories, Incorporated, a corporation of Pennsylvania
No Drawing. Filed Jan. 21, 1965, Ser. No. 427,102
17 Claims. (Cl. 260—279)

This invention relates to hexahydro-9-acridanols having the formula

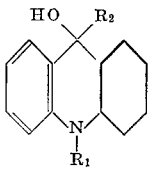

wherein $R_1$ is a member selected from the group consisting of loweralkyl, aminoloweralkyl and diloweralkylaminoloweralkyl; and $R_2$ is a member selected from the group consisting of hydrogen, aryl and substituted aryl (wherein the substituents are loweralkyl, loweralkoxy, dialkoxy or alkylenedioxy) and the non-toxic, therapeutically active acid addition salts thereof.

The term "loweralkyl" includes alkyl groups containing 1 to 7 carbon atoms, including saturated aliphatic chains, straight or branched, such as methyl, ethyl, propyl, isopropyl, n-butyl, isobutyl, isopentyl, hexyl, etc.

The term "loweralkyl" in the terms "aminoloweralkyl" and "diloweralkylaminoloweralkyl" includes alkyl groups containing 1 to 3 carbon atoms, including saturated aliphatic chains, straight or branched, such as methyl, ethyl, propyl and isopropyl.

The aminoloweralkylacridanones and the diloweralkylaminoloweralkylacridanones of this invention may be converted to their acid addition salts by reaction with an appropriate acid, such as, hydrochloric, sulfuric, acetic, maleic, fumaric acids, etc.

The compounds of this invention absorb ultra violet light and are useful as sun-screening materials in salves and ointments. In addition, because of their solubility in organic materials generally, they may be used as ultra violet absorbers in plastics and resins, such as polystyrene, polyethylene, polypropylene, (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultra violet light, such as in plastic film or light filters. The absorber may be incorporated in the mixture of monomers before polymerization to form the polymer or it may be incorporated in the polymer at any stage during its handling, as by milling into the polymer with other compounding ingredients or during the spinning of polymers into fibers, etc.

Certain of the compounds of this invention, for example, 1,2,3,4,4a,9a - hexahydro - 10 - dimethylaminoethyl-9-acridanol and 1,2,3,4,4a,9a-hexahydro-10-dimethylaminopropyl-9-acridanol possess hypotensive activity in varying degree.

The novel compounds of this invention where $R_2$ is hydrogen may be prepared by reducing the appropriate 1,2,3,4-tetrahydro-10-$R_1$-9-acridanones with a reducing agent such as an alkali metal aluminum hydride, for example, lithium aluminum hydride. They may also be prepared by reducing the appropriate 1,2,3,4,4a,9a-hexahydro-9-acridanones described in the copending application of Joseph Albert Meschino, filed January 21, 1965, Serial No. 427,134 with lithium aluminum hydride. A suitable solvent such as diethylether, diethyleneglycoldimethylether, tetrahydrofuran or dioxane may be used.

The novel compounds of this series wherein $R_2$ is aryl or substituted aryl may be prepared by reacting the appropriate 1,2,3,4,4a,9a-hexahydro-9-acridanones described in the copending application of Joseph Albert Meschino, loc. cit. with an aryl or substituted aryl metal halide such as, for example, phenylmagnesium bromide or methoxyphenylmagnesium bromide, tolylmagnesium bromide, o-methoxyphenylmagnesium bromide, etc., or with an aryl or substituted aryl metal such as, for example, phenyllithium, tolyllithium, o-methoxyphenyllithium, napthalenelithium, etc. A non-protonic solvent such as diethylether, benzene, tetrahydrofuran or dioxane may be used.

The starting materials for the preparation of the novel 1,2,3,4,4a,9a-hexahydro-9-acridanols wherein $R_2$ is hydrogen, namely the corresponding 1,2,3,4-tetrahydro-9-acridanones, may be prepared by reacting the appropriately substituted anthranilic acids with cyclohexanone as described, for example, by H. Tiedtke, Ber. 42, 621 (1909).

The following examples are intended to illustrate, but not to limit, the scope of the present invention.

*Example I*

A solution of 21.2 g. of 1,2,3,4-tetrahydro-10-methyl-9-acridanone in 300 ml. of tetrahydrofuran (warming is necessary) is added dropwise to a suspension of 11.4 g. of lithium aluminum hydride in 100 ml. of tetrahydrofuran. The reaction is stirred for 72 hours after which the excess hydride is decomposed with about 30 ml. of water. Filtration and concentration of the solution under vacuum gives a yellow cottony solid which when recrystallized from methylcyclohexane yields 1,2,3,4,4a,9a-hexahydro-10-methyl-9-acridanol, M.P. 75–78° C.

*Example II*

A solution of 10 g. of 1,2,3,4,4a,9a-hexahydro-10-methyl-9-acridanone in 100 ml. of tetrahydrofuran is added dropwise to a suspension of 5 g. of lithium aluminum hydride in 50 ml. of tetrahydrofuran. The reaction mixture is stirred for 72 hours after which it is hydrolyzed, filtered and concentrated to dryness. The residue is recrystallized from methylcyclohexane to give 1,2,3,4,4a,9a-hexahydro-10-methyl-9-acridanol, M.P. 75–78° C.

*Example III*

To a suspension of 3.0 g. of lithium aluminum hydride in 50 ml. of tetrahydrofuran is added dropwise a solution of 12.0 g. of 1,2,3,4-tetrahydro-10-dimethylaminoethyl-9-acridanone in 150 ml. of the same solvent. After stirring at room temperature for 8 hours the reaction mixture is hydrolyzed, filtered and concentrated to dryness to give a yellow semi-crystalline product. Recrystallization from ether-petroleum ether gives 1,2,3,4,4a,9a-hexahydro-10-dimethylaminoethyl-9-acridanol, M.P. 112–114° C.

*Example IV*

To a stirred suspension of 2.0 g. of lithium aluminum hydride in 50 ml. of tetrahydrofuran is added a solution of 5.0 g. of 1,2,3,4,4a,9a-hexahydro-10-dimethylaminopropyl-9-acridanone in 50 ml. of tetrahydrofuran. Stirring is continued overnight after which the reaction mixture is hydrolyzed, filtered and concentrated to dryness. The crystalline residue is recrystallized from ether-petroleum ether to give 1,2,3,4,4a,9a-hexahydro-10-dimethylaminopropyl-9-acridanol, M.P. 104–105° C.

*Example V*

A Grignard reagent is prepared from 1.7 g. of magnesium and 13.6 g. of o-bromoanisole in 100 ml. of ether. To this is added 8.0 g. of 1,2,3,4,4a,9a-hexahydro-10-methyl-9-acridanone in 200 ml. of benzene. The ether is then distilled off and the benzene solution is refluxed for a period of 20 hours. Hydrolysis is effected with dilute hydrochloric acid after which the layers are separated. The organic layer is washed twice more with dilute hydrochloric acid solution. The combined aqueous extractions are then made basic with solid potassium carbonate and extracted twice with ether. The combined ether layers are dried and concentrated to dryness leaving a greenish residue. The residue is recrystallized from ethyl acetate to give 1,2,3,4,4a,9a-hexahydro-9-(o-methoxyphenyl)-10-methyl-9-acridanol, M.P. 186–187° C.

*Example VI*

Using the procedure of Example I and replacing 1,2,3,4-tetrahydro-10-methyl-9-acridanone with an equivalent amount of one of the following 1,2,3,4-tetrahydro-10-ethyl-9-acridanone
1,2,3,4-tetrahydro-10-propyl-9-acridanone
1,2,3,4-tetrahydro-10-isopropyl-9-acridanone
1,2,3,4-tetrahydro-10-(n-butyl)-9-acridanone
1,2,3,4-tetrahydro-10-isobutyl-9-acridanone
1,2,3,4-tetrahydro-10-isopentyl-9-acridanone
1,2,3,4-tetrahydro-10-hexyl-9-acridanone
1,2,3,4-tetrahydro-10-heptyl-9-acridanone the corresponding 1,2,3,4,4a,9a-hexahydro-10-loweralkyl-9-acridanol is obtained, for example, 1,2,3,4,4a,9a-hexahydro-10-ethyl-9-acridanol
1,2,3,4,4a,9a-hexahydro-10-propyl-9-acridanol
1,2,3,4,4a,9a-hexahydro-10-isopropyl-9-acridanol
1,2,3,4,4a,9a-hexahydro-10-(n-butyl)-9-acridanol
1,2,3,4,4a,9a-hexahydro-10-isobutyl-9-acridanol
1,2,3,4,4a,9a-hexahydro-10-isopentyl-9-acridanol
1,2,3,4,4a,9a-hexahydro-10-hexyl-9-acridanol
1,2,3,4,4a,9a-hexahydro-10-heptyl-9-acridanol

*Example VII*

Using the procedure of Example III and replacing 1,2,3,4-tetrahydro-10-dimethylaminoethyl with an equivalent amount of one of the following 1,2,3,4-tetrahydro-10-diethylaminomethyl-9-acridanone
1,2,3,4-tetrahydro-10-diethylaminoethyl-9-acridanone
1,2,3,4-tetrahydro-10-dipropylaminopropyl-9-acridanone
1,2,3,4-tetrahydro-10-diisopropylaminopropyl-9-acridanone
1,2,3,4-tetrahydro-10-diisopropylaminoisopropyl-9-acridanone
1,2,3,4-tetrahydro-10-aminopropyl-9-acridanone
1,2,3,4-tetrahydro-10-diisopropylaminoethyl-9-acridanone
1,2,3,4-tetrahydro-10-aminoisopropyl-9-acridanone
1,2,3,4-tetrahydro-10-diethylaminoisopropyl-9-acridanone the corresponding 1,2,3,4,4a,9a-hexahydro-10-diloweralkylamino-loweralkyl-9-acridanol or 1,2,3,4,4a,9a-hexahydro-10-amino-loweralkyl-9-acridanol is obtained, for example 1,2,3,4,4a,9a-hexahydro-10-diethylaminomethyl-9-acridanol
1,2,3,4,4a,9a-hexahydro-10-dipropylaminopropyl-9-acridanol
1,2,3,4,4a,9a-hexahydro-10-diisopropylaminopropyl-9-acridanol
1,2,3,4,4a,9a-hexahydro-10-diisopropylaminoisopropyl-9-acridanol
1,2,3,4,4a,9a-hexahydro-10-aminopropyl-9-acridanol
1,2,3,4,4a,9a-hexahydro-10-diisopropylaminoethyl-9-acridanol
1,2,3,4,4a,9a-hexahydro-10-aminoisopropyl-9-acridanol
1,2,3,4,4a,9a-hexahydro-10-diethylaminoisopropyl-9-acridanol

*Example VIII*

Using the procedure of Example V and replacing the o-bromoanisole with an equivalent amount of one of the following in the preparation of the Grignard reagent bromobenzene
o-bromotoluene
dimethoxybromobenzene
bromonaphthalene
methylene dioxybromobenzene
propoxybromobenzene the corresponding 1,2,3,4,4a,9a-hexahydo-9-aryl-10-methyl-9-acridanol is formed, for example 1,2,3,4,4a,9a-hexahydro-8-phenyl-10-methyl-9-acridanol
1,2,3,4,4a,9a-hexahydro-9-dimethoxyphenyl-10-methyl-9-acridanol
1,2,3,4,4a,9a-hexahydro-9-naphthyl-10-methyl-9-acridanol
1,2,3,4,4a,9a-hexahydro-9-methylenedioxyphenyl-10-methyl-9-acridanol
1,2,3,4,4a,9a-hexahydro-9-propoxyphenyl-10-methyl-9-acridanol

What is claimed is:

1. A member selected from the group of hexahydro-9-acridanols having the formula

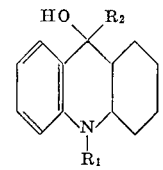

wherein $R_1$ is a member selected from the group consisting of loweralkyl aminoloweralkyl an diloweralkylaminoloweralkyl; $R_2$ is a member selected from the group consisting of hydrogen, phenyl, loweralkylphenyl, loweralkoxyphenyl, diloweralkoxyphenyl, alkyleneoxyphenyl and naphthyl; and the non-toxic, therapeutically active acid addition sats thereof.

2. 1,2,3,4,4a,9a-hexahydro-10-methyl-9-acridanol.
3. 1,2,3,4,4a,9a-hexahydro-10-dimethylaminoethyl-9-acridanol.
4. 1,2,3,4,4a,9a-hexahydro-10-dimethylaminopropyl-9-acridanol.
5. 1,2,3,4,4a,9a-hexahydro-9-(o-methoxyphenyl)-10-methyl-9-acridanol.
6. 1,2,3,4,4a,9a-hexahydro-10-ethyl-9-acridanol.
7. 1,2,3,4,4a,9a-hexahydro-10-propyl-9-acridanol.
8. 1,2,3,4,4a,9a-hexahydro-10-isopropyl-9-acridanol.
9. 1,2,3,4,4a,9a-hexahydro-10-isobutyl-9-acridanol.
10. 1,2,3,4,4a,9a--hexahydro-10-diethylaminomethyl-9-acridanol.
11. 1,2,3,4,4a,9a-hexahydro-10-diethylaminopropyl-9-acridanol.
12. 1,2,3,4,4a,9a-hexahydro10-aminopropyl-acridanol.
13. 1,2,3,4,4a,9a-hexahydro-10-diisopropylaminoethyl-9-acridanol.
14. 1,2,3,4,4a,9a-hexahydro-9-phenyl-10-methyl-9-acridanol.
15. 1,2,3,4,4a,9a-hexahydro-9-dimethoxyphenyl-9-acridanol.
16. 1,2,3,4,4a9a-hexahydro-9-naphthyl-9-acridanol.
17. 1,2,3,4,4a,9a-hexahydro-9-methylenedioxyphenyl-9-acridanol.

References Cited by the Examiner

UNITED STATES PATENTS 3,067,137  12/1962  Schmulling _____ 260—279 XR
3,131,190  7/1964  Zirkle _____ 260—279

ALEX MAZEL, *Primary Examiner.*

HENRY R. JILES, DONALD G. DAUS,
*Assistant Examiners.*